F. M. DAVIS.
CONVERTIBLE FURNITURE.
APPLICATION FILED JULY 1, 1915.
1,295,443.
Patented Feb. 25, 1919.
6 SHEETS—SHEET 1.
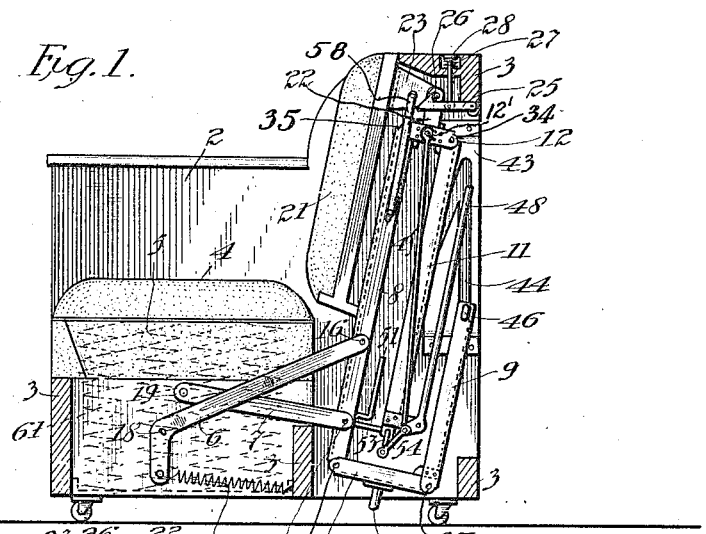
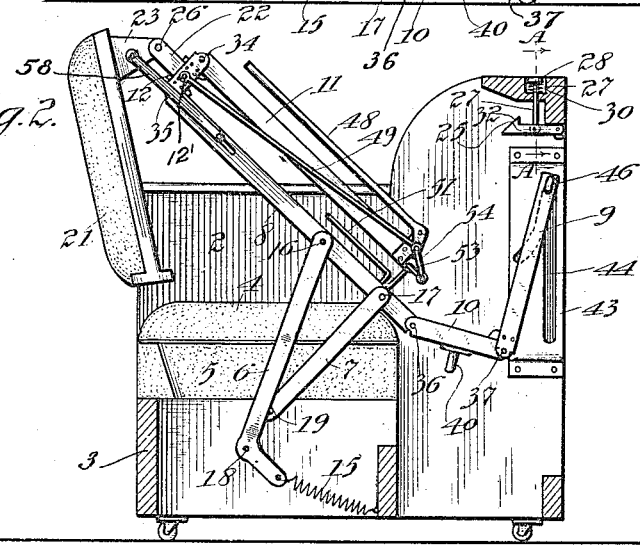
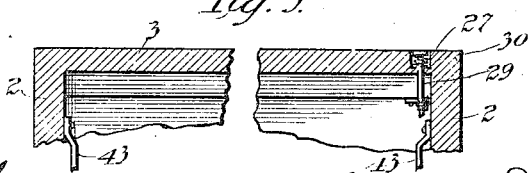

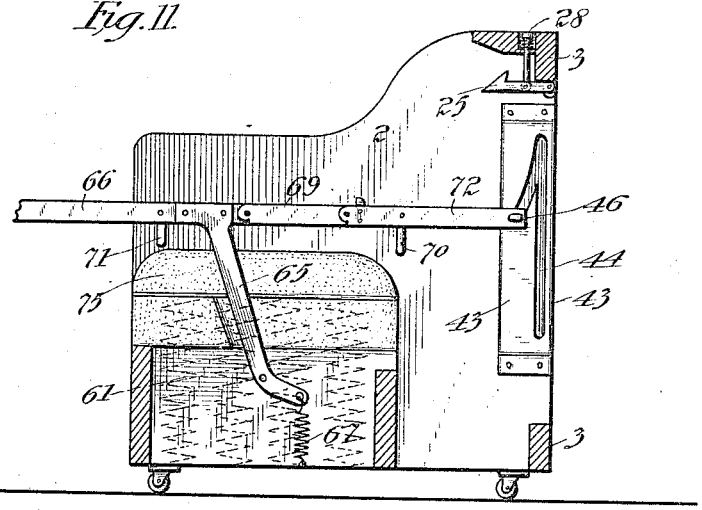
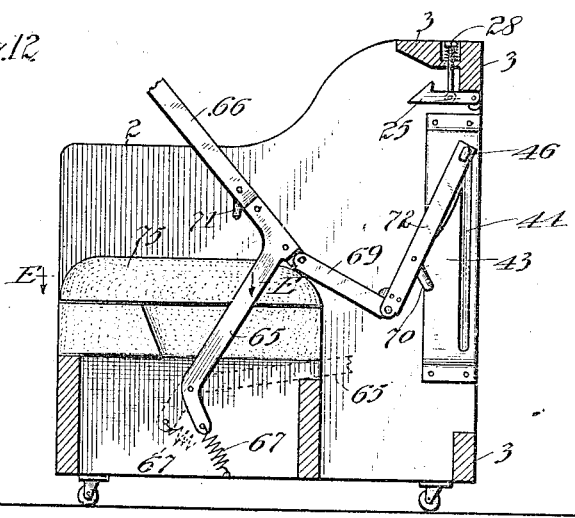
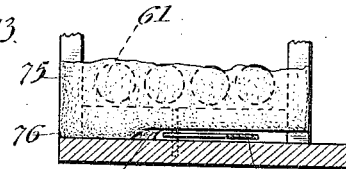

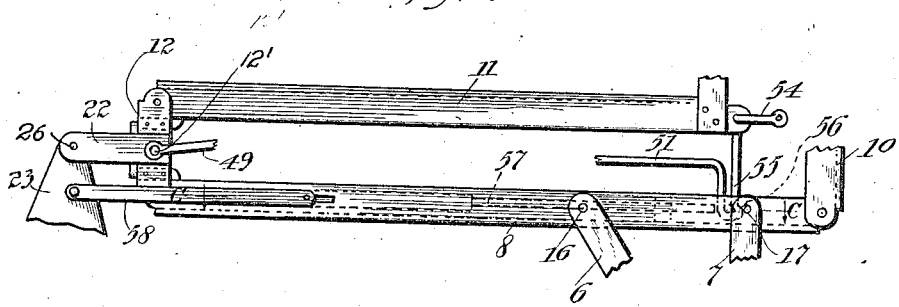
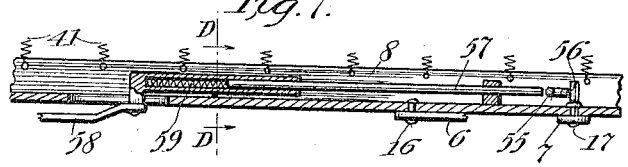
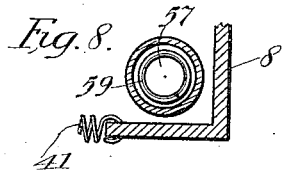
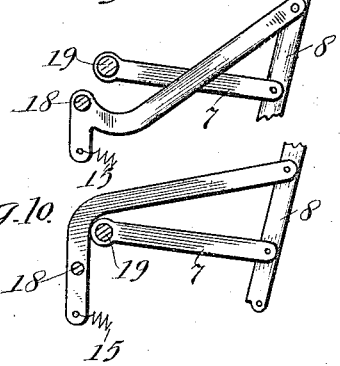

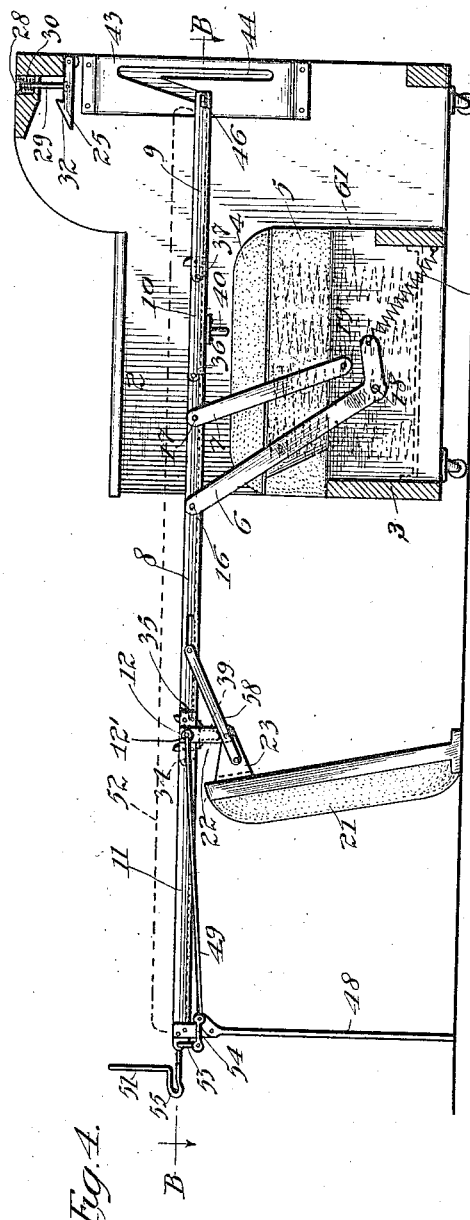

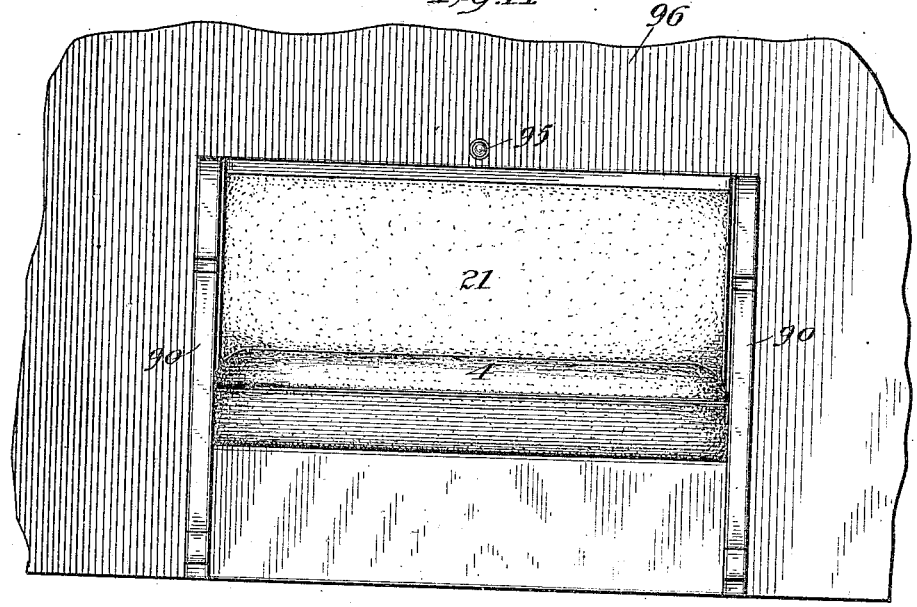
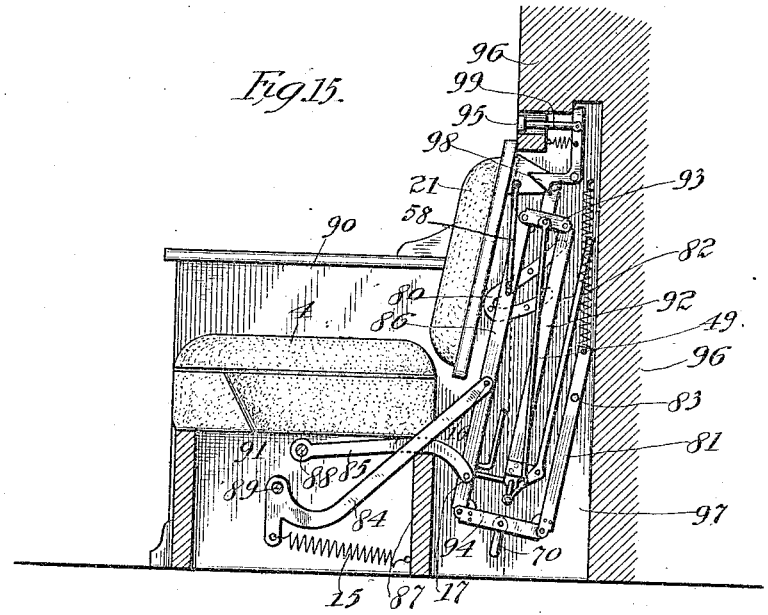

F. M. DAVIS.
CONVERTIBLE FURNITURE.
APPLICATION FILED JULY 1, 1915.
1,295,443.
Patented Feb. 25, 1919.
6 SHEETS—SHEET 6.
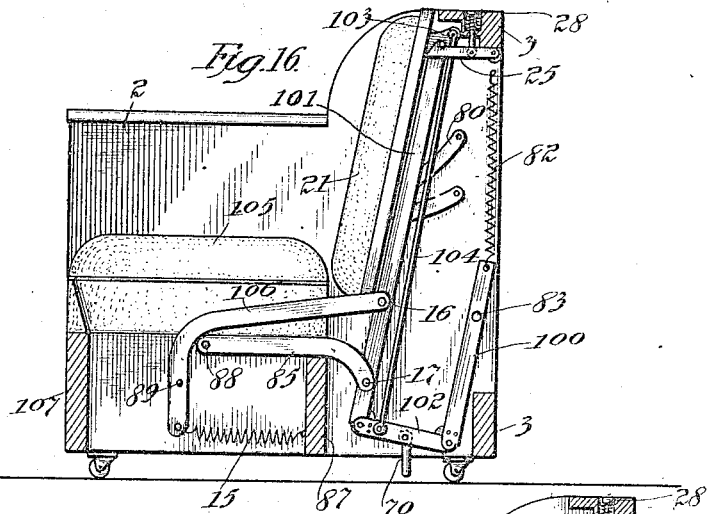
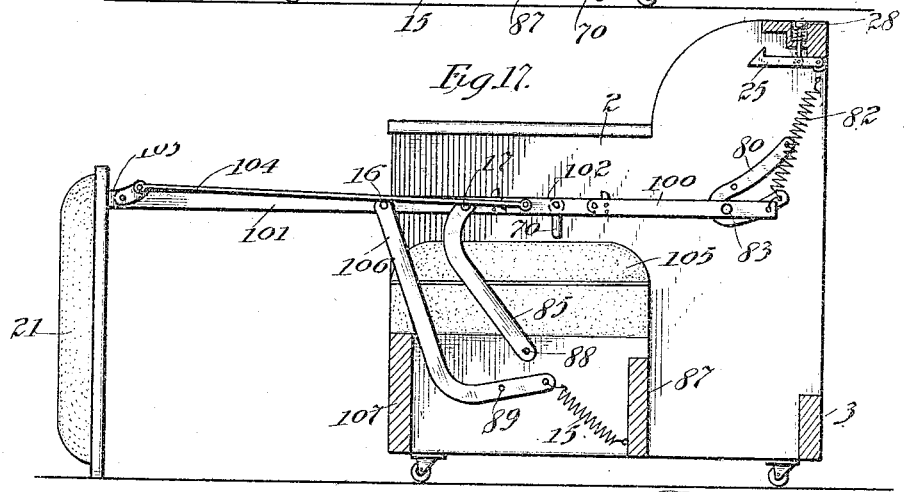
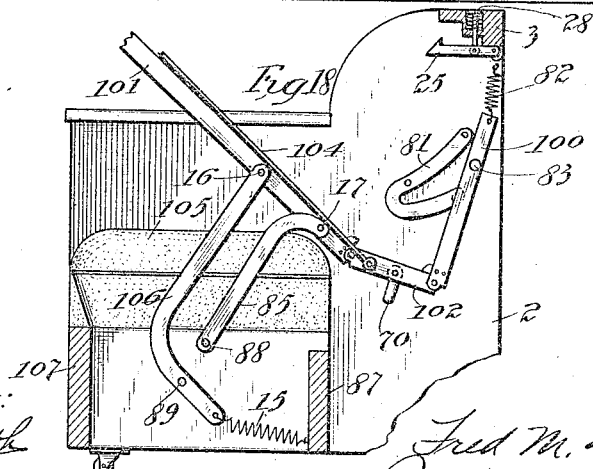

UNITED STATES PATENT OFFICE.

FRED M. DAVIS, OF CHICAGO, ILLINOIS, ASSIGNOR TO PULLMAN COUCH COMPANY, OF CHICAGO, ILLINOIS, A CORPORATION OF ILLINOIS.

CONVERTIBLE FURNITURE.

1,295,443.

Specification of Letters Patent.

Patented Feb. 25, 1919.

Application filed July 1, 1915. Serial No. 37,495.

*To all whom it may concern:*

Be it known that I, FRED M. DAVIS, a citizen of the United States of America, and a resident of Chicago, Cook county, and State of Illinois, have invented certain new and useful Improvements in Convertible Furniture, of which the following is a specification.

This invention relates to that type of sofa beds and bed davenports and the like in which the bed bottom when folded is disposed behind the back and seat, and which is pulled forward in converting the device into a bed.

The main objects of this invention are to provide a convertible bed device in which the seat is more yielding than is usual in sofa beds, and in which there is provided a deep space in the seat frame for placing large upholstering springs, such as used in the best grades of non-convertible furniture; to provide an improved arrangement for folding the bed bottom sections with the bedding in made-up form; to provide improved means for swinging the bed bottom easily to and from its folded position behind the back and seat, and independently of the seat; to provide improved automatic section-locking means; to provide improved means for controlling the pivoted bedding clamp automatically; to provide a bed device of this kind adapted for making up in either sofa or davenport form, and which may be arranged for mounting in an opening in the wall of a room so as to constitute a combination wall bed and sofa; and to devise a device of the character stated which is compact and in all respects presents the appearance of a plain non-convertible seating device.

Illustrative embodiments of this invention are shown in the accompanying drawings, in which—

Figure 1 is a side view of a sofa bed with the near end of the sofa frame removed.

Fig. 2 is a similar view with the device partly unfolded.

Fig. 3 is a fragmentary section through the upper part of the back on the line A—A of Fig. 2, and shows means for manually releasing the folded bed sections preparatory to unfolding.

Fig. 4 is a view similar to Fig. 1 but showing the device entirely unfolded.

Fig. 5 is a fragmentary plan of the device unfolded as in Fig. 4, the frame being shown in section on the line B of Fig. 4.

Fig. 6 is an enlarged fragmentary side view of the two outer broad sections and associated parts, and shows particularly the automatic lock for securing the foot section folded upon the middle section.

Fig. 7 is a section on the line C—C of Fig. 6.

Fig. 8 is an enlarged cross-section of the side rail of the middle section and associated locking means on the line D—D of Fig. 7.

Fig. 9 is a fragmentary side view of a modification showing a part of the middle section and supporting links, one of which is curved so as to permit of supporting the stationary pivots at both ends and give clearance for the swinging of the curved link.

Fig. 10 is a similar view in which the curved link is of a different shape adapted to avoid crossing the other link.

Fig. 11 is a side view of an embodiment with the bed in its unfolded position, in which the middle or main section is carried by a single arm at each end, each of said arms being used instead of a pair of links.

Fig. 12 is a similar view with the bed partly folded.

Fig. 13 is a fragmentary plan on the line E of Fig. 12.

Fig. 14 shows in front elevation an embodiment of the invention in which the sofa bed is built into an apertured wall in such manner as to present the appearance of an ordinary sofa set close against the side of the room.

Fig. 15 is a cross-section of the device of Fig. 14 and shows the mechanism in elevation.

Fig. 16 is an embodiment of the invention in the form of a davenport bed, the front end of the davenport frame being removed.

Fig. 17 is similar to Fig. 16, but shows the device unfolded to its bed form.

Fig. 18 is similar to Figs. 16 and 17 but shows the device partly unfolded.

In the construction shown in Figs. 1 to 5, a sofa bed is shown in which the bed bottom is extensible longitudinally across the frame of the sofa.

The sofa frame comprises ends 2 and connecting members 3. The frame of the seat 4 is attached directly to the sofa frame, preferably in a demountable manner, as by screws or the like, as is understood in the art. The front part of the seat fits closely between the frame ends. A narrow slot 5 is provided between the ends of the seat and the frame ends at or near the middle and adjacent to the rear edge of the seat, the purpose of which is to receive the bed bottom supporting links or arms 6 and 7 made in the form of thin plates, as hereinafter described. Said slot is preferably so thin that it is not noticeable to the casual observer, and may be practically concealed by the upholstering.

The bed bottom comprises a main section 8, a head section 9, a large connecting section 10 therefor, a foot section 11, and a small connecting section 12. Said links 6 and 7 are attached to the main section, one pair at each end. Each of said arms is turnably connected both to said section 8 adjacent to its rear edge and to a relatively stationary part of the sofa bed, preferably to shoulder or pivot means on the inner side of the frame end 2 or on the outer end of the seat and between the adjacent frame and seat ends, preferably the latter.

One link 6 of each pair is formed as a lever and is provided with an arm to which a lifting spring 15 is attached, whereby the bed may be folded and unfolded with greater facility, said spring being arranged to slacken as the swinging parts pass through the medial part of their movement, and to tighten as they swing to rest either open or folded.

Two of the adjacent ends of said links are attached to the main section near its rear edge at points spaced apart longitudinally, and the other ends are held at pivotal points suitably spaced apart on the stationary part of the sofa, the relative lengths of said links and their points of pivoting being so arranged that said main frame is swung from its upright position behind the back and seat in sofa position to a horizontal position above the seat, and extending forward therefrom in bed position. The longer link 6 has its bed pivot 16 above the corresponding pivot 17 of the other link, and its fixed pivot 18 is in front of and below the corresponding pivot 19 of link 7.

When the bottom is folded the three large sections stand nearly upright or incline backward somewhat toward the top, and the connecting sections are disposed in a nearly horizontal position.

The sofa back 21 is turnably connected at or adjacent to its upper edge to the bed bottom, as by brackets 22 on opposite sides of the outer connecting section 12. When the bed is unfolded the back swings to an upright position under the bed and in front of the sofa frame. When so disposed it rests on the floor and serves as supporting means for the bed bottom. When the device is folded the back swings against the main section 8. The upper part of the back 21 is provided with a bracket 23 on each side to which is pivoted the said section bracket 22.

Automatic locking means engage the movable member when it is restored to its sofa position. For this purpose a latch 25 is pivoted to the sofa frame and is arranged to coact with a suitable shoulder on the bed bottom, as for instance an outwardly projecting pin 26 on the bracket 23. Yielding means 27 are arranged to urge said latch into operative engagement with said pin. Means are provided for releasing said latch manually, preferably a push button 28 mounted on a shaft 29 pivoted to said latch, the said yielding means 27 being disposed to react between said button and the bottom of a socket 30 in the frame. The forward edge of said latch is inclined at 32 so as to be thrown back automatically by the pin 26 on the bed bottom as the latter swings back into its sofa position. Said push button 28 is preferably formed to lie substantially flush with the exposed surface of the part wherein it is housed, in this instance the top of the sofa frame, and may be colored to match the finish of the wood.

The joints 34 and 35 for the short section 12 are formed to limit opening to 180 degrees, and to limit folding to 90 degrees. The joints 36 and 37 for section 10 are preferably formed substantially in like manner, except that the outer or forward joint 36 need not be limited as to folding and the rearward joint 37 need not be limited as to unfolding.

Spacing bars or braces 39 and 40 are provided for holding the sides of the bed bottom spaced apart against the tension of the bed spring 41, said bars being attached to the connecting sections and being bent downward medially to give clearance for the bed spring, as understood in the art.

In unfolding the device the foot section remains folded on the middle section while the latter is being swung to its bed position. The foot section is then swung outward to its bed position. By this movement the back 21 is swung down to rest on the floor, as shown in Fig. 4. The head section unfolds with respect to the middle section as the latter swings to its bed position. The inner or rear edge of the head section is carried in this movement by guide means 43, secured to each of the frame ends. Each of said guides is in the form of a plate provided with a slot 44 having a rear vertical part and an inclined part extending downward from the upper end. A lateral shoulder 46 on each side of the head section coacts with said slot in folding and unfolding. Said shoulder is preferably flattened parallelly of said section so that when the rear edge of the head section is at its highest point where it turns pivotally about said shoulder, it will be guided down the vertical part of the slot in folding, and down the inclined part in unfolding the bed.

Automatic legs 48 support the outer end of the foot section when unfolded. Said legs are provided with upwardly projecting lever arms which are connected by means of links 49 to the connecting section 12.

A bedding fastener clamp 51 is pivoted to the outer end of the foot section and is operated automatically to secure the bedding 52 when the device is being folded. The bedding clamp is provided with a lever arm 53 and a link 54 which is connected to the adjacent leg controlling link 49, as illustrated in Fig. 4.

Automatic locking means for securing the foot section in spaced folded relation with respect to the middle section are provided, comprising a downwardly projecting part 55 of the bedding fastener, as illustrated in Fig. 6. Said part constitutes a latch, the lower end of which is formed to yieldingly engage a projecting pin 56 on the side rail of the middle section 8. In order to secure said latch and pin rigidly when the middle section is swung over to its seat position, an automatic plunger 57 is provided for pressing the latch against the pin 56. Said plunger is carried by the side rail of the middle section and is slidable longitudinally thereof. Said plunger is connected by a link 58 to the back-supporting bracket 23, and is actuated by the swinging of the back as the device is folded. In order that said plunger may be effective upon a slight turning of the middle section in folding, it is formed of sections arranged telescopically with a spring 59 urging it extensibly. When the middle section begins to turn, the forward end of the plunger presses lightly against the latch 55, and as the turning continues gravity swings the back closer to the middle section and urges the plunger more tightly against the latch, and so locks it securely until released when the device is again unfolded.

One of the principal features of the device is that the seat is stationary and is provided with a deep frame wherein are mounted large upholstering springs 61, shown in Fig. 1. By this means a resilient and very yielding seat is obtained.

It will be noted that by means of the double link mounting for each side of the bed section 8, it is possible to dispose said section compactly adjacent to the seat in its several positions and also to swing it well forward for its bed position as shown by comparing Figs. 1 and 4.

The operation for converting the device from a sofa to a bed is as follows: The operator first actuates the releasing member 28, thereby disengaging the latch 25 and permitting the lifting spring to throw the bed bottom forward somewhat. The operator then grasps the upper part of the bed bottom or back 21 and pulls forwardly, causing the main and head sections, and the connecting section 10 to assume a horizontal position and permitting the back to swing downward in front of the sofa frame. This movement of the back releases the foot section lock 55 except as to its yielding engagement. The operator then grasps the free end of the foot section and pulling upward disengages the yielding latch 55 and swings the section 11 outward to its bed position. This straightens out the short section 12 and unfolds the legs 48. At the same time the bedding fastener 51 is released automatically, and the bed in made-up form is ready for use. Except for pressing the button 28 the operation requires only two movements on the part of the operator.

The operation for folding the bed is as follows: The operator grasps the foot rail and swings the foot section over upon the main section. The main section and back are then swung to their sofa position by grasping the spacing bar 39 and swinging the same rearwardly. In folding and unfolding the device the inner end of the head section travels in the guides 43. The several devices for holding the bedding in place and for locking the foot section, etc., act without any attention from the operator. When the sections swing back into place the latch 25 automatically secures the same in sofa position. The operator makes two motions only.

In the embodiment shown in Figs. 11, 12 and 13 the bed bottom, though shown only in a fragmentary way, is substantially like that shown in Fig. 1. In this form, however, a single arm or lever 65 is provided instead of a pair of links for supporting each side of the middle section here designated by numeral 66. Only the inner part of this section is shown. Said lever is connected to a lifting spring 67 which operates substantially as previously described. In this instance the spacing bar for the connecting section 69 is omitted, and in place thereof is provided a pair of spacing bars 70 and 71 secured pivotally to the head section 72 and middle section respectively adjacent to said connecting section. In this instance the slot 74 for the lever 65 is particularly small and secluded, and the seat 75 and frame ends 2 abut snugly together at the front part of the device, as at 76. The other parts of the device may be substantially the same as in Figs. 1 to 5.

The operation of this embodiment is mainly similar to that previously described, and is substantially two-motion in character, both in folding and unfolding. The device is somewhat more rigid than the first embodiment, but is more limited in the range of swinging of the main section for a given radius of supporting arm.

In the construction shown in Figs. 14 and 15 the invention is embodied in a wall bed device or sofa-wall-bed. The construction and operation of the bed bottom and swinging back 21 is substantially the same as in Fig. 1, except that the guide 80 for the head section 81 is of a different form, and a supplementary lifting spring 82 is provided which also serves especially to control in large measure the operation of the head section. A shoulder 83 on the side of the head section at a medial point coacts with said guide 80 as the section 81 swings forward and backward. The links 84 and 85 for the middle section 86 operate substantially the same as those in Fig. 1, except that the short link 85 is curved so as to permit of a higher end for the rear panel 87 of the seat frame, and the long link 84 is curved so as to avoid swinging past the stationary pivot 88 for the short section. By this construction the stationary pivots 88 and 89 may be made in the form of shafts supported at both ends by the sofa ends 90 and adjacent seat ends 91 respectively. The foot section 92 and adjacent connecting section 93 are similar to those shown in Fig. 1. The inner connecting section 94 is provided with joints formed to limit opening to 180 degrees and to limit closing to about 90 degrees. In this instance the push button 95 for releasing the sections is mounted in the wall 96 above the sofa. Said push button may be made to match the wall so as to be inconspicuous. Said ends 90 may be secured permanently to the wall 96 if desired. The folded bed bottom is normally disposed mainly in the wall aperture 97. When folded the device resembles an ordinary non-convertible sofa set close against the wall. The apertured wall feature results in economy of room space both when the device is used as a sofa and as a bed.

The latch 98 for holding the back and bed bottom in sofa position has an arm projecting upward for coaction with the horizontal push plunger 99. A spacing bar 70 similar to bar 70 of Fig. 11 is pivoted to section 94. Otherwise the structure and operation are substantially like that already described.

The operation is substantially the same as in the first form, except as to the means for guiding the head section, and the structure is practically a two-motion device.

In the embodiment shown in Figs. 16, 17 and 18, the invention is applied to a bed davenport. In this instance the head section 100, the main section 101, and the connecting section 102 are substantially similar to those in the other embodiments herein shown, except that the bed sections are wider from one frame end to the other so as to provide a bed disposed longitudinally of the main frame, and more particularly said sections are similar to those shown in Fig. 15. In this instance the back 21 has a bracket 103 pivoted directly to the outer part of the main section 101 and is controlled automatically by means of a link 104 by which it is connected to the middle or connecting section. Said back serves as a leg or supporting means for the main section. In this instance the short supporting link 85 for the main section is curved to clear the upper edge of the high back panel 87 of the seat 105. The long supporting link 106 is curved so as to avoid crossing the short link 85, and has an arm connected to the lifting spring 82. When the device is unfolded, said long link preferably bears against the rear upper corner of the front panel 107 of the seat and gives added support and rigidity to the structure. Otherwise the device is mainly similar to the forms previously described, as indicated by like numerals in such instances.

This is a one-motion device, and so far as the parts shown are concerned the operation is similar to that of the corresponding parts in Fig. 1.

It is to be understood that the guide 80 and spring 82 shown in Figs. 15 to 18 may be used if desired in the devices shown in Figs. 1, 2, 4, 11 and 12 in place of the form of corresponding means there shown.

Although several illustrative embodiments of this invention are herein shown and described, it is to be understood that the invention is not limited thereto and it will be further understood that some of the details of the constructions shown may be altered or omitted without departing from the spirit of this invention as defined by the following claims.

I claim:

1. In a device of the class described, a stationary frame or supporting member comprising a seat and having a shallow aperture or housing chamber back of the seat, in combination with a foldable sectional bed bottom disposed normally behind the seat in close proximity thereto with its long sections in a substantially upright position, and a pair of links on each side, one of which in each pair is pivoted at one end to the stationary member, and at its opposite end to the lower part of one of the bed sections, the other link being longer and pivoted to the stationary member at a point diagonally downward and forward of the pivot point of the first link, and the opposite end being pivoted to the same bed section at a point above the connection of the first link, whereon said section may be swung from its upright position behind the seat to a horizontal position above the seat in spaced relation thereto in converting the device into a bed, said device having means to arrest the forward swing of said section when it reaches its horizontal position.

2. In a device of the class described, a rigid member including upright ends and connecting means therefor, a seat disposed between said ends, said seat having deeply yielding springs, said seat and ends being spaced apart slightly intermediately of the front and back edges of the seat and adjacent to the rear edge of the seat to provide clearance slots and fitting closely together at and adjacent to the front edge of the seat to present the usual unitary appearance of a sofa, in combination with a foldable sectional bed bottom disposed normally behind the seat, and supporting means attached to one of the bed bottom sections and connected turnably to the said rigid member, said supporting means being swingable in the slots between said seat and said ends in swinging the bed bottom to and from its bed position over the seat.

3. In a device of conventional sofa appearance, a rigid member comprising frame ends and a seat disposed between said ends and secured thereto, said seat and frame ends having a narrow clearance aperture of unnoticeable character extending from the rear edge forwardly to an intermediate point, in combination with a foldable sectional bed bottom, and a pair of links at each end of said seat on which said bed bottom is swingably mounted, said links being swingable forward in said aperture for unfolding the bed bottom, and said links having their lengths so proportioned and having their pivotal points on one of the bed bottom sections and on the seat frame respectively so arranged and spaced apart as to cause the bed bottom to swing from a substantially upright folded position behind the seat to a horizontal position above the seat.

4. In a device of the class described having normally the conventional appearance of a davenport or sofa, a frame, and a seat mounted rigidly thereon with a narrow storage aperture behind the seat, in combination with a foldable sectional bed bottom including a main section disposed uprightly in said aperture behind and adjacent to the back edge of the seat and having positively operating supporting means connected thereto, said means being turnably connected to a stationary part of the sofa and being adapted to swing the bed bottom free from any projection thereof back of said frame to and from its storage position, connecting sections at the opposite ends of said main section, a foot section attached to one of said connecting sections, and a head section attached to the other of said connecting sections, said device being compact and convertible from one form to the other with said frame disposed adjacent to the wall.

5. In a sofa bed, a foldable sectional bed bottom comprising a main section, a foot section and a connecting section, a leg turnably connected to the side of said foot section, a link connecting said leg and a part of the connecting section that is spaced from the joint for the foot section whereby the leg is folded and unfolded automatically, a bedding fastener turnably mounted on an axis disposed adjacent to one edge on the outer part of said foot section, a lever arm attached operatively to said fastener and extending oppositely from said fastener respecting said axis, and a second link connecting said arm to the first mentioned link whereby the bedding fastener is swung back automatically to engage the bedding when the foot section is folded over on the main section.

6. In a device of the class described, a combined section latch and bedding fastener, comprising a pivotal part and a crank part adapted for actuation by the folding and unfolding of the foot section, an outwardly projecting latch part adapted to coact with a correspondingly formed part of one of the sections and a transverse part disposed and adapted to grip the bedding.

7. In a device of the class described, a foldable sectional bed bottom including a main section, a foot section and a connecting section, said main and foot sections having coacting means formed and arranged to mutually engage each other yieldingly when said sections are folded together, in combination with urging means mounted movably on the main section for urging said coacting means into relatively unyielding engagement when the main section is swung to its sofa position, and means carried by said main section for advancing said urging means into its operative position when said main section is swung backwardly.

8. In a device of the class described, a foldable sectional bed bottom having a main section and a foot section foldable thereon, said sections having means adapted to coact yieldingly when said sections are folded together, a back pivotally connected with the main section adjacent to its edge which swings farthest and is foremost when the device is unfolded and depending therefrom as said section is swung to and from its sofa position, and lock-actuating means operated by the relative turning of said back and main section for locking said coacting means together more securely as the main section swings away from its bed position.

9. In a device of the class described, a foldable sectional bed bottom having a main section and a foot section foldable thereon, said sections having means adapted to coact yieldingly when said sections are folded together and said sections normally being disposed uprightly and their upper edges being turnably connected, a back turnably connected to the main section adjacent to its upper or free edge and depending therefrom as said section is swung on an axis relatively near its lower edge to and from its sofa position, and lock-actuating means operated by the relative turning of said back and main section for locking said coacting means together more securely as the main section swings away from its bed position, said actuating means comprising a telescopic rod having a spring for urging the rod sections extensibly, and a link connecting said back and the adjacent end of said rod.

10. In a device of the class described, a rigid supporting member, in combination with a foldable sectional bed bottom including a main section, a head section and a connecting section, means secured to said main section and mounted turnably on said supporting means for swinging said main section from an upright position in the rear part of said supporting means to a horizontal position in the upper part thereof, said head section having a lateral shoulder disposed intermediately of its front and rear edges, guide means convergent downwardly and forwardly and open rearwardly on said supporting means at one side of said head section for coaction with said shoulder when the head section is in its bed position and while adjacent thereto in being swung to and from said position, and yielding means urging the rear part of said head section upwardly both in its sofa and bed positions, said head section being carried by said guide means when near its bed position and by said yielding means when near its sofa position.

11. In a device of the class described, a rigid supporting member, in combination with a foldable sectional bed bottom adapted to form a receptacle for storing the bedding in made-up form when the device is in its sofa form and including a main section, a head section and a connecting section, said sections having joints formed to limit folding of adjacent sections to about 90 degrees, and the forward joint being formed to limit unfolding to substantially 180 degrees, means secured to said main section and mounted turnably on said supporting means for swinging said main section from an upright position in the rear part of said supporting means to a horizontal position in the upper part thereof, said head section having a lateral shoulder disposed intermediately of its front and rear edges, means on said supporting means at one side of said head section including an upwardly facing forward part for coaction with said shoulder when the head section is in its bed position to support the same, and an inclined part facing downwardly and rearwardly for guiding said shoulder to its seat in unfolding the device, and yielding means urging the rear part of said head section upwardly both in its sofa and bed positions.

12. A folding davenport, couch or similar article provided with a sectional mattress frame that can be opened and closed, and a back joined to one section of said frame by means of links which are so designed that said back can be arranged parallel to said section or at substantially right angles to same.

13. A folding davenport, couch or similar article provided with an extensible mattress frame, a shiftable back joined to said frame by means of links so that it will serve as a support for the front end of same when the article is open, and means on said frame that coöperates with said links to transmit the load on said frame to said back.

14. A folding davenport, couch or similar article provided with a sectional mattress frame that can be opened and closed, and a back joined to one section of said frame by means of hinge members and links which are so designed that said back can be arranged parallel to said section or at substantially right angles to same.

Signed at Chicago this 29th day of June, 1915.

FRED M. DAVIS.

Copies of this patent may be obtained for five cents each, by addressing the "Commissioner of Patents, Washington, D. C."